United States Patent
Barker et al.

(10) Patent No.: US 10,340,583 B2
(45) Date of Patent: Jul. 2, 2019

(54) CELLULAR ANTENNA FOR ELEVATED AND OBSTRUCTED DEPLOYMENT

(71) Applicant: Quintel Technology Limited, Bristol (GB)

(72) Inventors: David Edwin Barker, Cheshire (GB); Peter Chun Teck Song, San Jose, CA (US)

(73) Assignee: Quintel Cayman Limited, George Town, Grand Cayman (KY)

( * ) Notice: Subject to any disclaimer, the term of this patent is extended or adjusted under 35 U.S.C. 154(b) by 0 days.

(21) Appl. No.: 16/158,876

(22) Filed: Oct. 12, 2018

(65) Prior Publication Data
US 2019/0115650 A1 Apr. 18, 2019

Related U.S. Application Data

(60) Provisional application No. 62/572,149, filed on Oct. 13, 2017.

(51) Int. Cl.
| | |
|---|---|
| *H04W 24/00* | (2009.01) |
| *H01Q 1/24* | (2006.01) |
| *H01Q 3/36* | (2006.01) |
| *H01Q 21/22* | (2006.01) |
| *H01Q 1/36* | (2006.01) |

(52) U.S. Cl.
CPC ............ *H01Q 1/246* (2013.01); *H01Q 1/36* (2013.01); *H01Q 3/36* (2013.01); *H01Q 21/22* (2013.01)

(58) Field of Classification Search
CPC ......... H03L 7/099; H03F 1/56; H04B 7/0456; H01Q 1/243; H04M 1/0266; H04W 28/0231; H04W 84/005; H04W 84/02; H04W 84/06

USPC ............ 370/335, 342; 455/456.1; 375/208; 342/368

See application file for complete search history.

(56) References Cited

U.S. PATENT DOCUMENTS

| | | |
|---|---|---|
| 6,340,948 B1 | 1/2002 | Munoz-Garcia et al. |
| 2003/0206134 A1 | 11/2003 | Lier et al. |
| 2006/0135097 A1 | 6/2006 | Wang et al. |
| 2007/0080886 A1 | 4/2007 | Thomas et al. |
| 2009/0058725 A1 | 3/2009 | Barker et al. |
| 2013/0222056 A1 | 8/2013 | Lin |

(Continued)

OTHER PUBLICATIONS

International Search Report and Written Opinion mailed in corresponding PCT/US2018/0055613 dated Jan. 2, 2019, 8 pages.

*Primary Examiner* — Phuoc H Doan
(74) *Attorney, Agent, or Firm* — Tong, Rea, Bentley & Kim, LLC

(57) ABSTRACT

In one example, the present disclosure provides a phased array antenna system with a first array of antenna elements and a first radio frequency beamforming network configured to split the power of a radio frequency signal for transmission into a first plurality of component signals comprising drive signals for the first array of antenna elements, the first radio frequency beamforming network further configured to combine a radio frequency signal for reception by the phased array antenna system from a second plurality of component signals from the first array of antenna elements, where a radio frequency power distribution of the first radio frequency beamforming network is arranged to provide a weighting of the first plurality and the second plurality of component signals processed via antenna elements towards one end of the first array.

20 Claims, 9 Drawing Sheets

900

(56) References Cited

U.S. PATENT DOCUMENTS

2015/0288438 A1 10/2015 Maltsev et al.
2017/0181010 A1 6/2017 Burgess et al.

CELLULAR ANTENNA FOR ELEVATED AND OBSTRUCTED DEPLOYMENT

CROSS-REFERENCE TO RELATED APPLICATIONS

This application claims priority to U.S. Provisional Patent Application Ser. No. 62/572,149, filed Oct. 13, 2017, which is herein incorporated by reference in its entirety.

FIELD OF THE DISCLOSURE

The present disclosure relates generally to cellular base station antennas, and relates more particularly to antenna systems with improved performance in elevated and obstructed locations, such as set back on rooftops of multi-story buildings.

BACKGROUND

Base station antennas designed for deployment in the macro-cellular network are typically deployed close to the mobile network traffic demand (subscribers) on towers, poles, and rooftops at heights which are significantly above the surrounding average height of other rooftops. This macro-cellular deployment minimizes diffractive propagation losses between the base station and the subscriber terminals hence maximizing coverage range and/or in-building penetration.

SUMMARY

In one example, the present disclosure provides a phased array antenna system with at least a first array of antenna elements and at least a first radio frequency beamforming network configured to split the power of a radio frequency signal for transmission into a first plurality of component signals, the first plurality of component signals comprising drive signals for the at least the first array of antenna elements, the at least the first radio frequency beamforming network further configured to combine a radio frequency signal for reception by the phased array antenna system from a second plurality of component signals from the at least the first array of antenna elements, where a radio frequency power distribution of the at least the first radio frequency beamforming network is arranged to provide a weighting of the first plurality of component signals and the second plurality of component signals processed via antenna elements of the plurality of antenna elements towards one end of the at least the first array.

In another example, the present disclosure provides a method that may include deploying at least a first array of antenna elements of a radio frequency antenna system to a building rooftop. In one example, the at least the first array of antenna elements is coupled to at least a first radio frequency beamforming network of the radio frequency antenna system. In one example, the at least a first radio frequency beamforming network is configured to split the power of a radio frequency signal for transmission into a first plurality of component signals, the first plurality of component signals comprising drive signals for the at least the first array of antenna elements. The at least the first radio frequency beamforming network may be further configured to combine a radio frequency signal for reception by the phased array antenna system from a second plurality of component signals from the at least the first array of antenna elements, where a radio frequency power distribution of the at least the first radio frequency beamforming network is arranged to provide a weighting of the first plurality of component signals and the second plurality of component signals processed via antenna elements of the plurality of antenna elements towards one end of the at least the first array. The method may further include performing at least one of transmitting the radio frequency signal for transmission via the at least the first radio frequency beamforming network and the at least the first array or receiving the radio frequency signal for reception via the at least the first array and the at least the first radio frequency beamforming network.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The current disclosure presents a solution to optimize (i.e., minimize) the propagation losses between a macro-cellular network base station antenna deployed on a rooftop and ground based subscriber terminals, when the antenna is deployed set-back from the rooftop edges. In one example, a beamforming network, or distribution feed network, with a modified amplitude distribution is used such that a substantial proportion of the RF power is allocated to the upper antenna elements. This skewed RF power distribution along the antenna array increases the effective height of the RF power above the rooftop, thus reducing the grazing angle from each antenna element to the rooftop edge, and hence reduces diffraction losses over the rooftop edge. For illustrative rooftop deployments, up to 3 dB reduction in propagation losses for mobile terminals on the ground can be achieved when compared to a base station antenna using a more conventional RF power distribution profile across the array. The present disclosure also illustrates that appropriate phase weights can be used with such "top-heavy" weighted amplitude distributions in order to develop an elevation plane beam pattern in the far field of the antenna suitable for cellular network deployment, such as having robust upper sidelobe level suppression (USLS). The present disclosure is not limited to passive beamforming networks and includes examples that utilize an active antenna arrangement where pre-coding weights can be applied to user-orientated data such that user-specific beamforming to optimize path loss in the elevation plane can be achieved for individual subscriber terminals.

Figure 1:
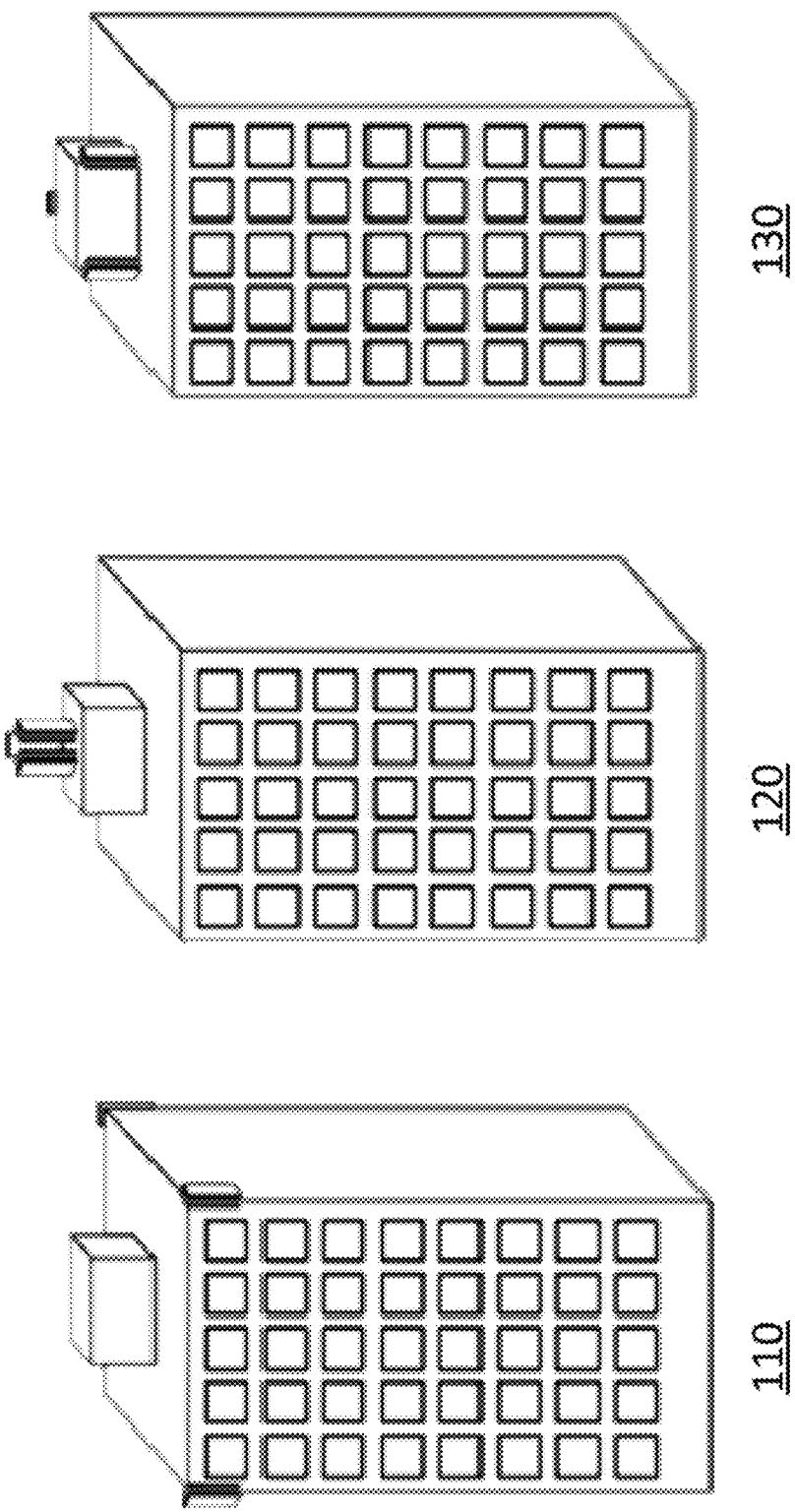
FIG. 1 depicts example base station antenna deployment configurations on buildings.

Base station antennas designed for deployment in the macro-cellular network are typically deployed close to the mobile network traffic demand (subscribers) on towers, poles, and rooftops at heights which are significantly above the surrounding average height of other rooftops. This macro-cellular deployment minimizes diffractive propagation losses between the base station and the subscriber terminals hence maximizing coverage range and/or in-building penetration. For rooftop antenna deployments, the antennas can be deployed in various ways, such as: antennas mounted on the sides of the building, antennas mounted at the very top of a building, typically exploiting a lift shaft or other maintenance structure, antennas mounted on the rooftop itself, and an antennas mounted set-back from the rooftop edge. These different configurations are illustrated in FIG. 1 as the examples 110, 120, and 130, respectively. Antennas mounted on the sides of buildings (e.g., example 110) can be optimal for maximizing coverage since the antenna radiation pattern is unobstructed. This option however requires antenna deployments on three sides of the building, corresponding to the three sectors of a typical cellular base station site. Most buildings are four-sided, and the three sectors generally need to each provide coverage across 120 degrees in azimuth. This means all the antennas cannot be mounted flush to the sides of the building, and are in need of brackets to be added. This is sometimes a cause of concern for zoning/planning permission, particularly in city and suburban areas.

Antennas deployed on the highest part of the building (e.g., example 120) can also be optimal for maximizing coverage, depending upon the size of the rooftop, since maximum height is attained. Furthermore, this option allows all the three sectors to be co-located allowing a simpler deployment to be facilitated, but can present an unsightly deployment solution. Antennas set back from the rooftop edge (e.g., example 130) help to hide the appearance of the antennas, especially from the streets below. This deployment option is popular in many cities and often the only choice of rooftop deployment allowed by city planning guidelines. A disadvantage of set-back rooftop deployments is that there is a physical obstruction between the antenna and subscriber terminals, due to the rooftop edge or parapet. This obstruction can introduce significant diffraction propagation losses. Minimizing these diffractive losses would allow improved signal strength across the service area, and hence greater in-building penetration and overall better service quality and experience.

The current disclosure includes examples to optimize (i.e., minimize) the propagation losses between a macro-cellular network base station antenna deployed on a rooftop and ground based subscriber terminals, when the antenna is deployed set-back from the rooftop edges. In one example, a beamforming network, or distribution feed network, is used with a modified amplitude distribution such that a substantial proportion of the RF power is allocated to the upper antenna elements. This skewed RF power distribution along the antenna array increases the effective height of the RF power above the rooftop, thus reducing the grazing angle from each antenna element to the rooftop edge, and hence reduces diffraction losses over the rooftop edge. The present disclosure also illustrates that appropriate phase weights can be used with such "top-heavy" weighted amplitude distributions in order to develop an elevation plane beam pattern in the far field of the antenna suitable for cellular network deployment, such as having robust upper sidelobe level suppression (USLS).

A base station antenna designed for broadband mobile communications networks typically includes one or more arrays, each array comprising a plurality of radiating antenna elements, and the arrays being capable of supporting one or multiple spectrum bands. The antenna elements of each array are connected to an RF beamforming network, distribution network, or RF feed network, which is designed to distribute RF power to the array elements, when considering a signal for transmission via the antenna array. The antenna elements of the array are typically arranged in a vertical plane, and designed to create a relatively narrow radiation pattern beam in the elevation plane (of 10 degrees for example). It should be noted that the vertical plane and elevation plane may refer to the same plane, with the former term more commonly used to refer to a physical orientation of an antenna array, and the latter more commonly used when referring to radiation patterns. Phase shifters are also typically used between the RF Feed network and antenna elements. The phase shifters are used to impart a linearly varying phase slope along the antenna array and hence vary the boresight direction of the radiated pattern in the elevation plane. This is known as Variable Electrical Tilt (VET) in order to control and optimize the cellular network coverage and interference parameters.

Antenna arrays designed for broadband mobile communications networks may have an RF feed network which distributes RF power with a certain amplitude and phase profile to the antenna elements. The amplitude and phase profile is typically designed for creating an optimized radiation pattern in the elevation plane. An optimized elevation pattern for base station antennas deployed in the macro-cellular network might have certain features such as: narrow beamwidth in elevation to maximize directivity and gain, strong upper side-lobe suppression (USLS) to help minimize inter-site interference, rapid upper mainbeam roll-off to help minimize inter-site interference, and lower side-lobe null-fill to help optimize coverage close to the base station site.

Figure 2:
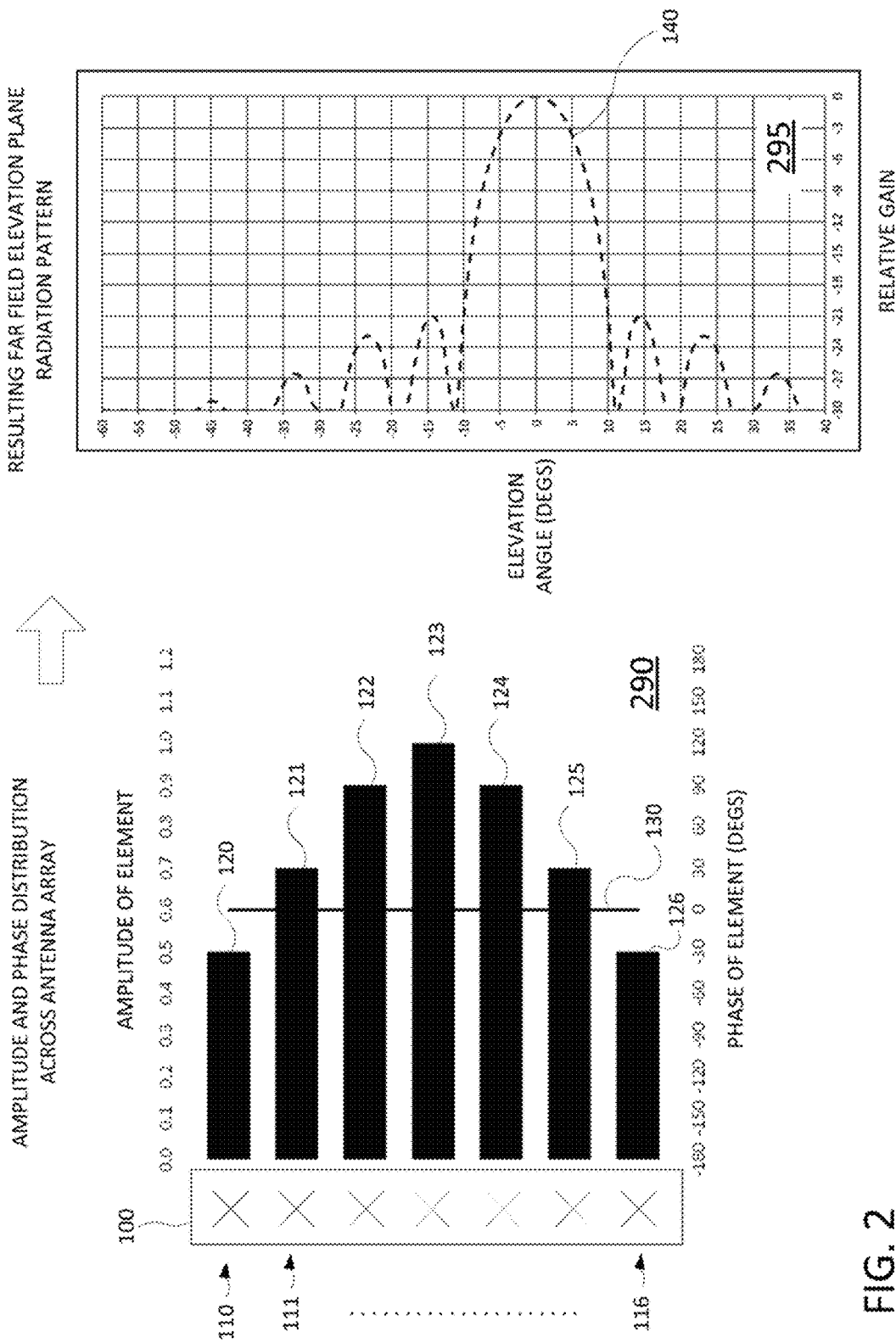
FIG. 2 depicts a conventional base station antenna amplitude and phase distribution, and a resulting far field radiation pattern in the elevation plane.

An industry specification for USLS is >18 dB for upper sidelobes to −30 degrees, meaning that the upper sidelobes are >18 dB lower in magnitude that the mainbeam. In one example, the present disclosure provides upper side-lobe suppression of a far field radiation pattern of 15 dB or greater relative to a mainbeam of the far field radiation pattern over a range of up to 30 degrees above the mainbeam. An example amplitude distribution which helps ensure minimal side-lobes is illustrated in graph 290 of FIG. 2. As illustrated in FIG. 2, a base station antenna (100) comprises an array of seven cross-polarized antenna elements (110-116). The antenna elements (110-116) are connected to a distribution network, which may be internal to the antenna (not shown), with an amplitude profile (120-126) symmetrically tapered around the center element. A flat phase profile (130) across the array is shown in FIG. 2 which results in a far field radiation pattern (140) in the elevation plane illustrated in graph 295 (relating elevation angle to relative gain), with good USLS and a directive main beam. There are other implementations which achieve good USLS. One method, although not shown, has equal amplitude at all elements but uses a specific phase profile which varies along the array. This approach has been referred to as "phase spoiling" since large phase changes from element to element are used. Such base station antennas are designed for deployments on to towers, sides of buildings and on to the top of buildings where there is very little or no obstructions close to, or in the near field of the antenna.

Figure 3:
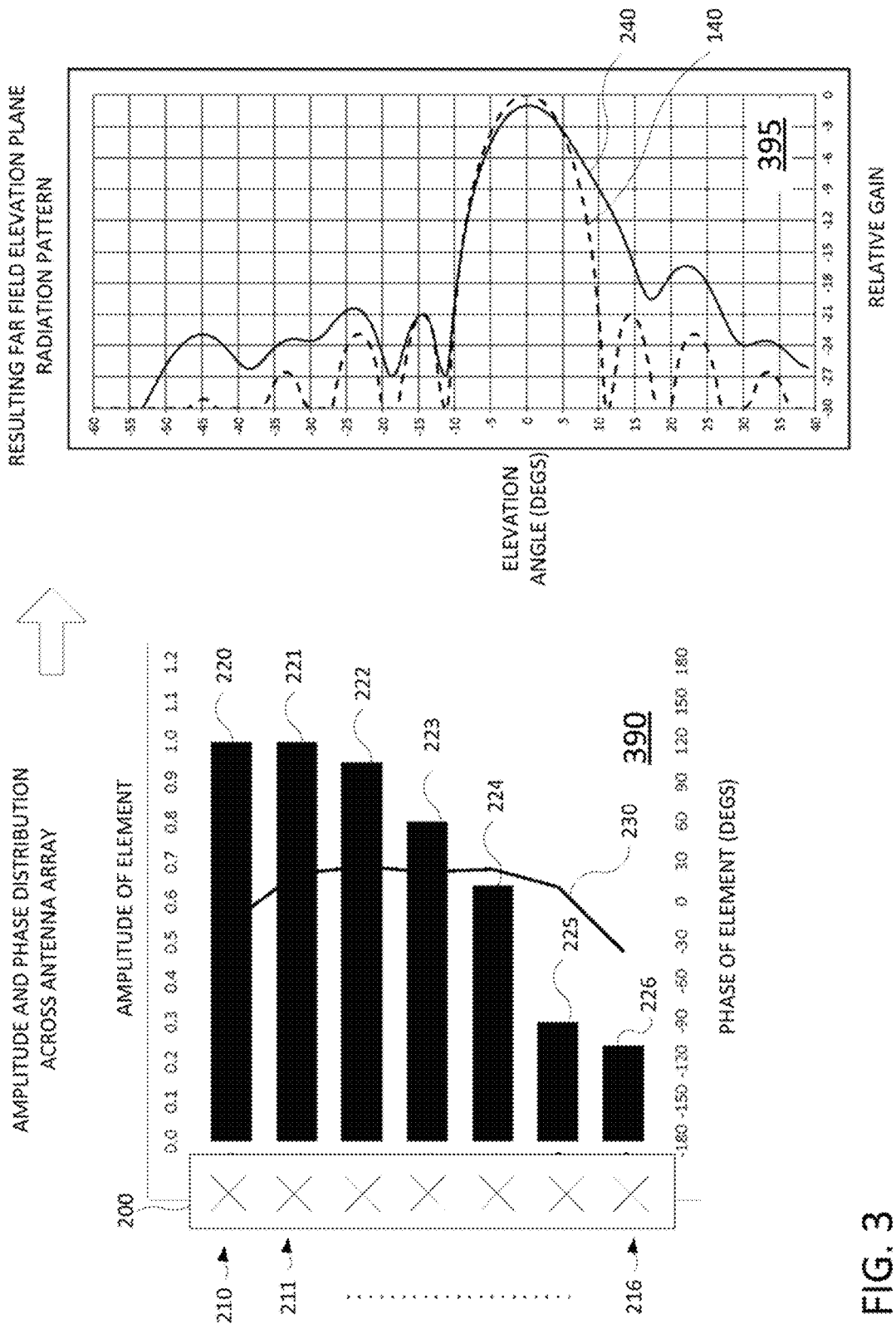
FIG. 3 depicts a rooftop optimized base station antenna amplitude and phase distribution, and a resulting far field radiation pattern in the elevation plane.

In one example, the present disclosure includes a base station antenna with an array of antenna elements having an amplitude distribution with significantly higher amplitude weights allocated to the antenna elements at the top end of the array; a "top-heavy" amplitude distribution. In addition, practical base station antenna radiation patterns in the elevation plane may be designed with such "top-heavy" amplitude distributions. An example is illustrated at FIG. 3. A base station antenna (200) comprises an array of seven cross-polarized antenna elements (210-216). The antenna elements are connected to a distribution network, which may be internal to the antenna (not shown), with a "top-heavy" amplitude profile, or amplitude distribution (220-226) and phase profile (230) across the array illustrated in the graph 390. This amplitude and phase profile results in a far field radiation pattern (240) in the elevation plane illustrated in graph 395 (relating elevation angle to relative gain). The radiation pattern for the tapered center-weighted distribution is shown at (140), as reference. The example "top-heavy" amplitude distribution (220-226) and phase weight distribution (230) creates a far field radiation pattern (240) in the elevation plane which has good USLS (e.g., better than 18 dB), a directive main beam, and a very similar upper main beam roll-off radiation pattern as compared to the array (100) of FIG. 2 with a center-weighted tapered amplitude distribution. In one example, the phase profile (230) may be selected in accordance with a self-optimization algorithm based upon a desired far field radiation pattern (e.g., including upper side lobe) as input. It can be seen that the "top-heavy" amplitude distribution however tends to lose some directivity relative to the center-weighted tapered amplitude distribution; in this example, about 0.5 dB loss in directivity.

The current disclosure however is intended for base station antennas which have some obstructions between the antenna and subscriber terminals, where the obstructions are close to the base station antenna, e.g., such as those antennas deployed on rooftops and set back from the rooftop edge. In these deployment cases the lower directivity is not a particular concern since the far field radiation pattern, especially at angles below the horizon, will be significantly disturbed by the rooftop edge being in or close to the near field of the antenna array. In fact, examples of the present disclosure are designed to provide improved effective gain, and hence improved cellular service coverage, at angles below the horizon.

Power radiated from an antenna array is not radiated from a single point, but is radiated from several points: i.e., the antenna elements. The resulting signal power received at a subscriber terminal will be in the far field of the antenna, and is the vector summation of the individual component signals from each antenna element, plus the vector sum of any multi-path reflections introduced in the radio channel. In the scenario where the antenna array is on a rooftop and set-back from the rooftop edge, the rooftop edge introduces diffraction loss between the antenna and subscriber terminal. The antenna elements closer to the rooftop and at the bottom of the array have the greatest diffraction losses to the subscriber whereas the antenna elements closer to the top of the antenna array have the least diffraction losses.

Figure 4:
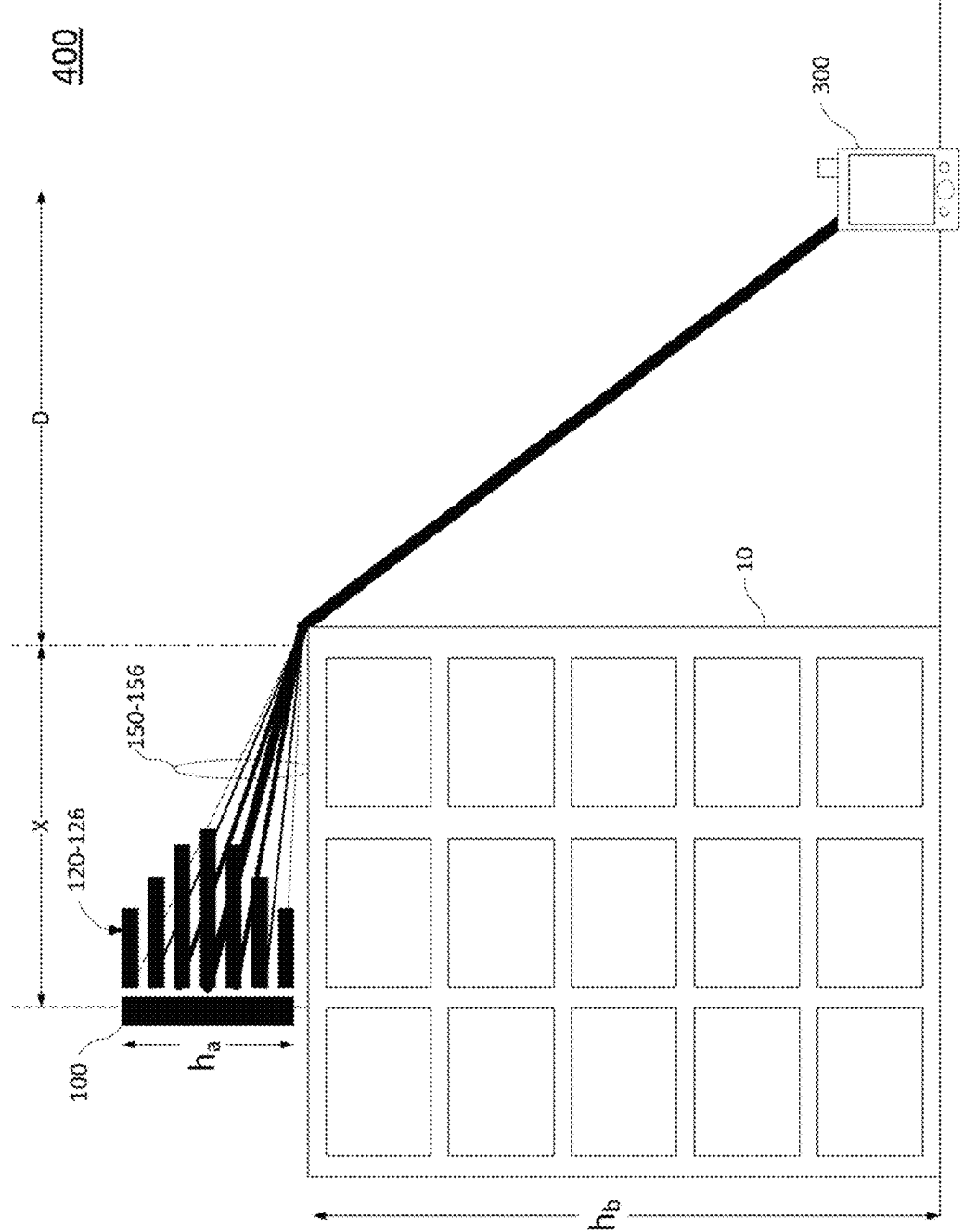
FIG. 4 depicts a conventional base station antenna deployed on a rooftop, and set-back from the rooftop edge.

FIG. 4 illustrates an example deployment scenario 400 using a conventional base station antenna (100) (e.g., an antenna array) deployed on a rooftop of a building (10) and set back from the rooftop edge by a distance of x. The base station antenna (100) has a center-weighted tapered amplitude distribution across the antenna array, denoted by amplitude weights (120-126). Assuming that there are no, or very weak, multi-path reflections introduced by the radio channel, the power received at the subscriber terminal (300) is a function of the vector sum of the component signals radiated from antenna elements denoted by propagation paths (150-156), respectively. The propagation path lines (150-156) have different thicknesses corresponding to the relative power of the component signals from each of the antenna elements.

Figure 5:
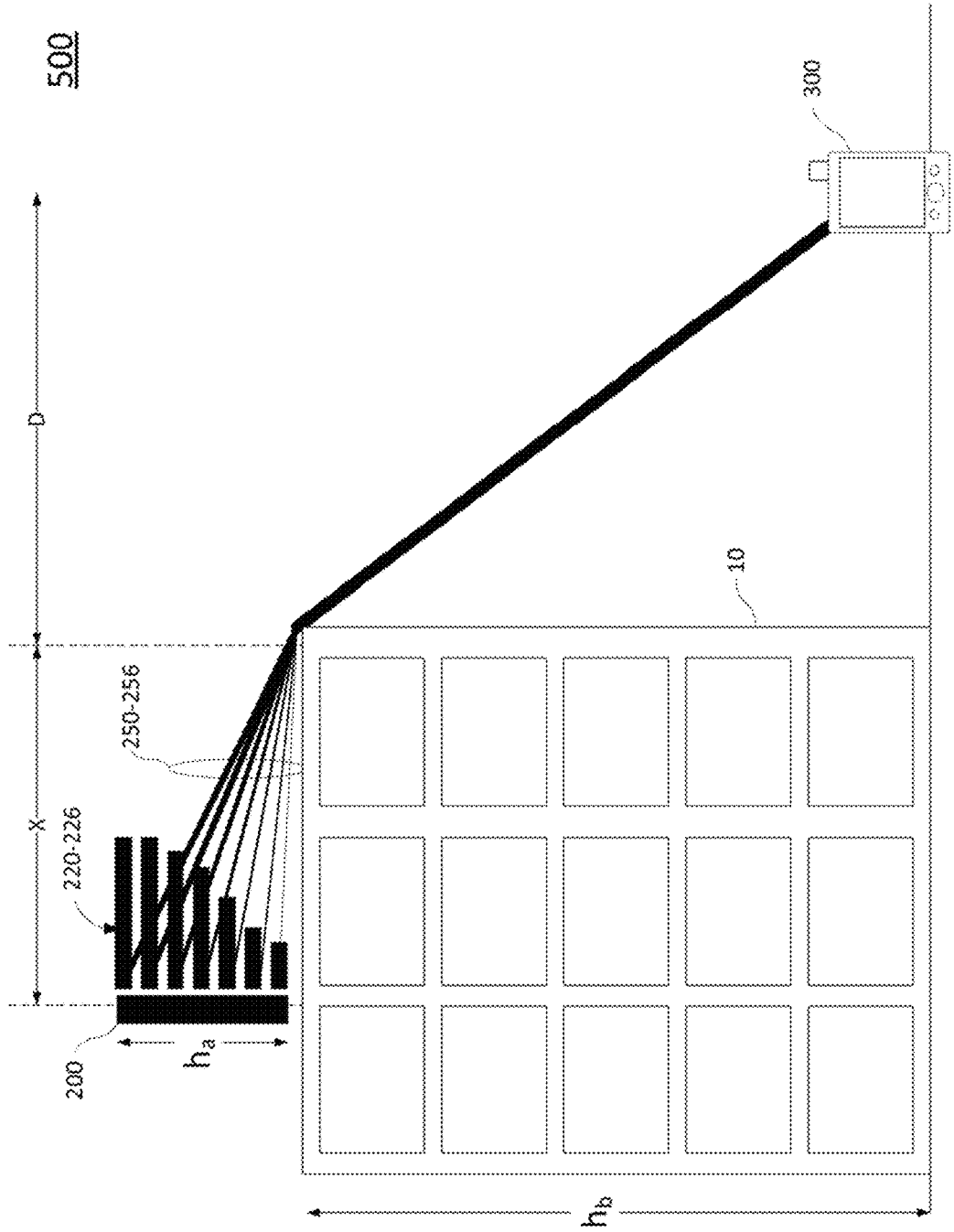
FIG. 5 depicts an optimized base station antenna deployed on rooftop, and set-back from the rooftop edge.

FIG. 5 illustrates an example deployment scenario 500 using an optimized base station antenna (200) (e.g., an antenna array) according to the present disclosure deployed on a rooftop of a building (10) and set back from the rooftop edge by a distance of x. The base station antenna (200) has "top-heavy" amplitude distribution across the antenna array, denoted by amplitude weights (220-226). Assuming that there are no, or very weak, multi-path reflections introduced by the radio channel, the power received at the subscriber terminal (300) is the vector sum of the component signals radiated from antenna elements, denoted by propagation paths (250-256), respectively. In this example, the top elements have the strongest power and undergo the lowest diffraction losses. The propagation path lines (250-256) have different thicknesses corresponding to the relative power of the component signals from each of the antenna elements. This arrangement optimizes the total power arriving at the subscriber terminal whilst still maintain elevation pattern properties desirable for cellular deployment. Of course, having all the RF power allocated to the top element and no power to the other elements would result in the maximum power at the subscriber terminal, but this may not create a desirable elevation radiation pattern with adequate USLS and main beam roll-off characteristics, which may be desirable for managing inter-site interference for cellular networks. It is worth noting that the influence of the rooftop edge diffraction to the antenna elevation patterns at angles approximately around and above the horizon will be much less, because the angles between neighboring cells and the base station antenna (200) will be shallow and hence less diffraction over the rooftop edge. As such, upper sidelobes and main beam roll-off will be impacted less.

The present disclosure utilizes a "top-heavy" antenna array amplitude distribution for antenna array deployments where there is or there is expected to be at least one diffraction edge between the antenna array and subscriber terminal. The "top-heavy" amplitude distribution is intended to maximize power received at the subscriber terminal, whilst maintaining an elevation plane radiation pattern which is desirable for cellular network deployment, in particular upper main beam roll-off and USLS. The present disclosure is also intended to achieve more power at the subscriber terminal than the power received at the subscriber terminal when using amplitude distributions more common with a conventional antenna array.

Figure 6:
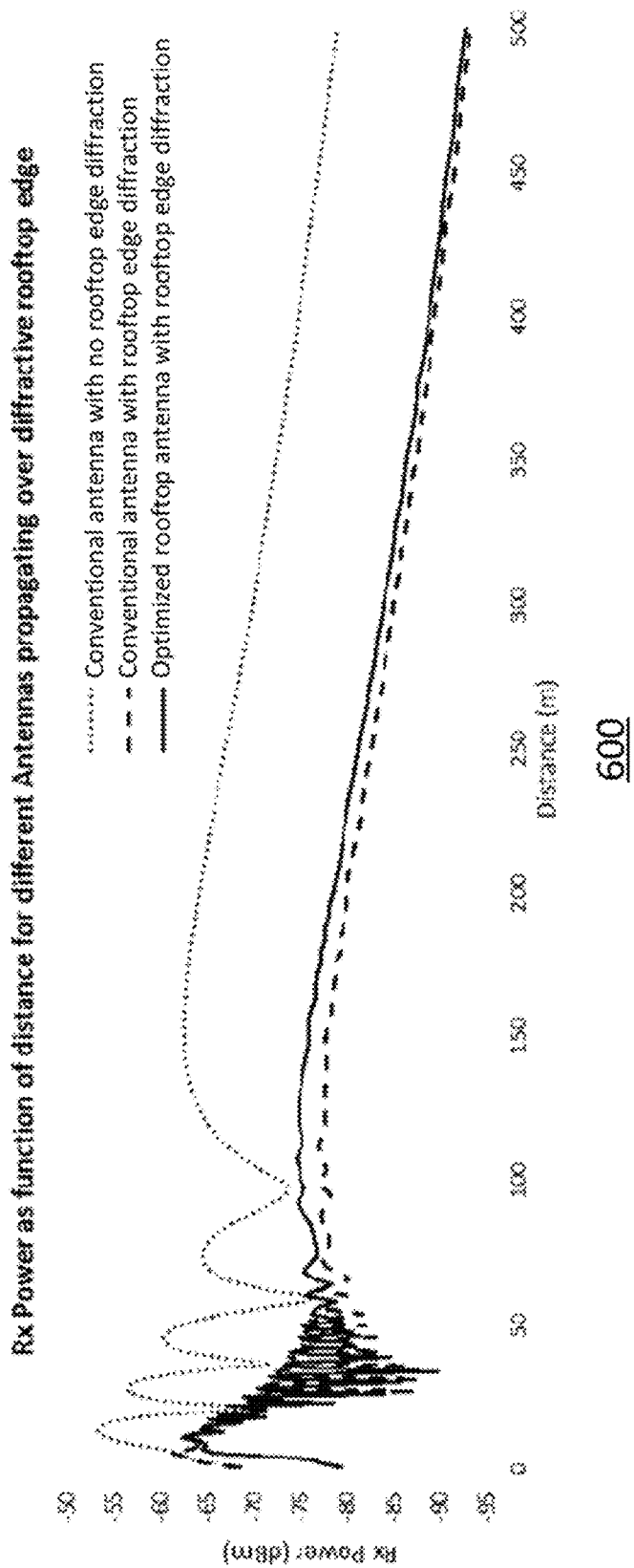
FIG. 6 illustrates signal power received on the ground for a conventional antenna without and with rooftop edge diffraction losses, and for an optimized rooftop antenna with rooftop edge diffraction losses.

FIG. 6 shows a graph 600 with simulated results for received signal power on the ground in dBm, and hence what a subscriber terminal might receive as a function of distance from the base station antenna for three cases: (1)

conventional base station antenna array with a center-weighted tapered amplitude distribution deployed on a rooftop edge with no diffraction losses, (2) conventional base station antenna array with a center-weighted tapered amplitude distribution deployed on a rooftop but set-back from rooftop edge by 6 m and hence suffering edge diffraction losses, and (3) Rooftop optimized base station antenna array with a "top-heavy" amplitude distribution deployed on a rooftop but set-back from rooftop edge by 6 m and hence suffering edge diffraction losses.

In the example of FIG. 6, the simulated antennas are at 30 m height and comprise 7 antenna elements over a length of 2.4 m with an elevation beam tilt of 5° at 750 MHz. The graph shows that the signal on the ground is improved using the rooftop optimized base station antenna array over a conventional antenna array for all relevant distances, with signal strength improvements of up to 3 dB seen. Whilst all the diffraction losses can never be recovered, 1-3 dB of signal strength improvement is a meaningful improvement to network performance and user experience in terms of service coverage, broadband data throughput, and battery life, since both uplink and downlink channels benefit from the reduced diffraction losses. In one example, to achieve a 3 dB gain without the present disclosure, an antenna of twice the array length would have to be used.

Figure 7:
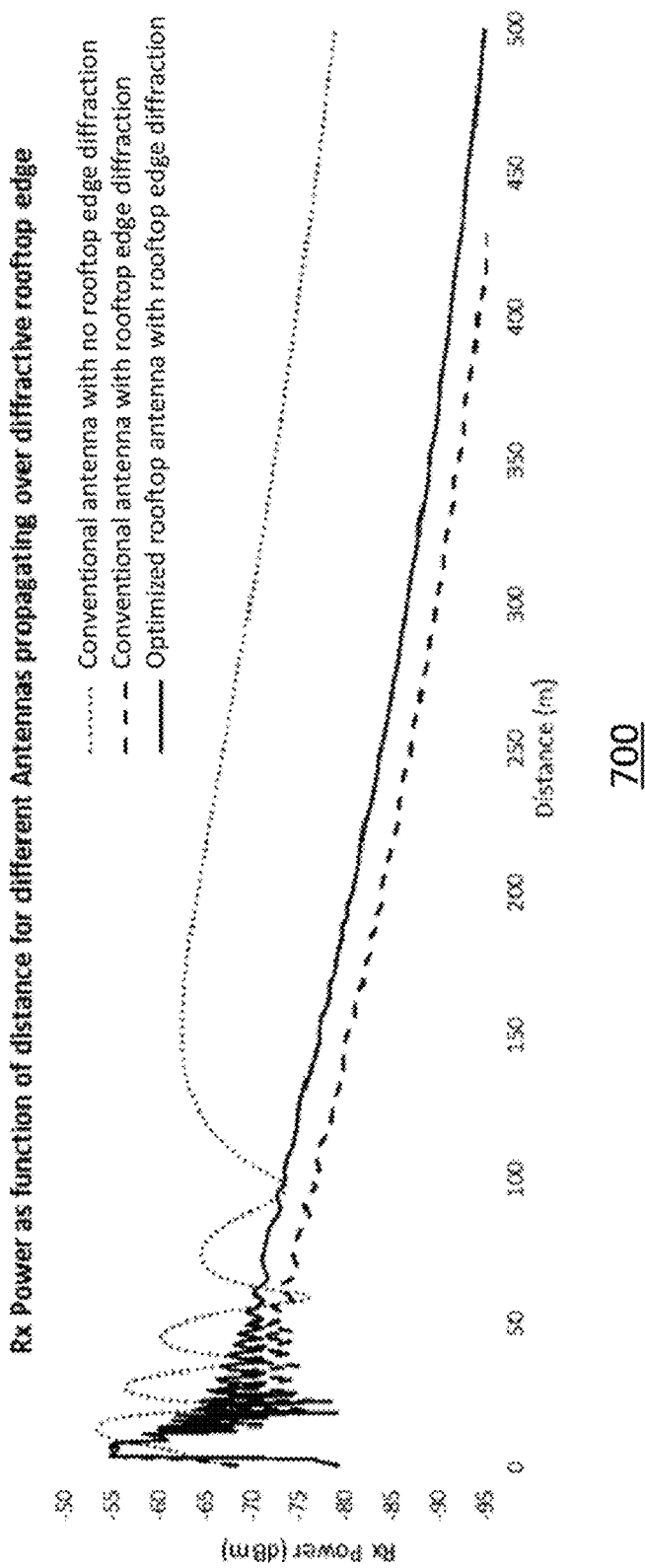
FIG. 7 illustrates signal power received on the ground for a conventional antenna without and with aggressive rooftop edge diffraction losses, and for an optimized rooftop antenna with aggressive rooftop edge diffraction losses.

FIG. 7 shows a graph 700 with additional simulated results for received signal power on the ground in dBm, and hence what a subscriber terminal might receive as a function of distance from the base station antenna for the same three cases as above, but with a more severe diffraction edge. In FIG. 7, the antennas for the second two examples are deployed on the rooftop and set-back 6 m as per the example in FIG. 6, but there is also a parapet wall of 1 m. The parapet wall introduces a greater diffraction loss. FIG. 7 shows that the signal on the ground is improved using the rooftop optimized antenna array over a conventional antenna array for all relevant distances with consistent signal strength improvements of around 4 dB observed.

Figure 8:
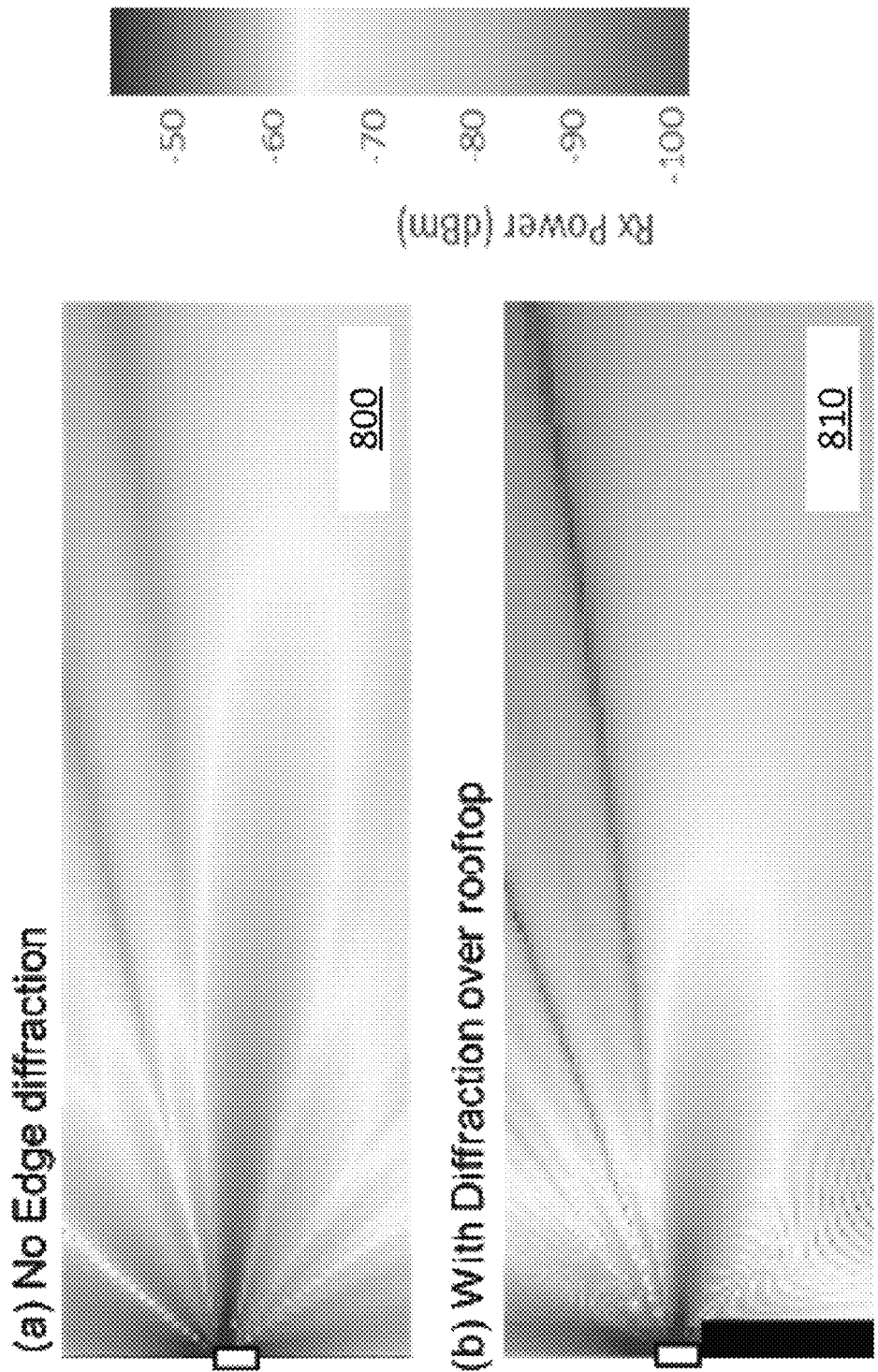
FIG. 8 illustrates received signal strength for a base station antenna without edge diffraction and for a base station antenna deployed on a 30 m rooftop and set-back from the rooftop edge by 6 m.

FIG. 8 depicts the variation in signal strength in the elevation plane as a function of vertical height and horizontal distance from the base station antenna, for a 30 m base station antenna height as (a) without any obstructions (pattern 800), and (b) when deployed on a rooftop and set-back 6 m from the rooftop edge (pattern 810). The simulated base station antenna comprises 7 antenna elements over a length of 2.4 m with an elevation beam tilt of 5 degrees at 750 MHz. FIG. 8 illustrates that there is significant signal attenuation when propagating over the rooftop edge and trying to serve subscriber terminals on the ground. In this case there is about 10 dB attenuation in signal strength on the ground between the two cases, and relates to that observed in FIG. 6. However, FIG. 8 also reveals that the signal power is attenuated for angles towards and above the horizon. This attenuation may be useful in terms of helping further decrease inter-site interference, or alternatively allow a relaxation of upper side-lobe suppression (USLS) specifications of the antenna design, since the upper sidelobes will be further reduced if deployed on a rooftop, set-back from the rooftop edge. This additional design freedom may provide more optimal amplitude and phase weight distributions to maximize signal strength on the ground.

Base station antennas deployed on rooftops and set back from the rooftop edge are often prone to passive intermodulation (PIM) interference which is caused by external PIM sources being radiated on the rooftop by the antenna(s). Such external PIM sources include cables, metal conduits, metal vents, grilles, screws, bolts and other fixings. Any of these items which might have loose-fitting metal junctions, particularly with dissimilar metals or with oxidization can be strong sources of external PIM interference. An additional benefit of the present disclosure is to help reduce PIM interference generated by external PIM sources on the rooftop, since the antenna elements of the present disclosure which radiate the strongest RF signal components are those elements at and near to the top of the antenna array. As such, these higher power radiation sources are farther away from potential PIM sources than for the case of a conventional antenna with a center-weighted tapered amplitude distribution of RF power along the antenna array.

Antenna systems suitable for deployment in cellular mobile communications networks may include multiple arrays in the same radome and sharing the same backplane/reflector. Additional arrays may be used to allow polarization diversity, higher order multiple-in multiple-out (MIMO) (e.g., multi-order MIMO, such as, 4×4, 6×6, 8×8, etc.) spatial processing to be exploited, and to support additional spectrum bands. These additional arrays may utilize the same RF beamforming network or one or more different RF beamforming networks.

Examples of the present disclosure may include antenna arrays using passive, reciprocal distribution networks (e.g., the same distribution network components for uplink and downlink), or may include active antenna arrays where amplitude and phase weights are generated prior to RF power amplification, either at low-power RF, at intermediate frequency (IF), baseband, or at user-specific baseband. In the latter case, it is then possible to pre-code information intended for a specific user across the antenna array leading to user-specific beamforming to minimize path loss in the elevation plane for individual subscriber terminals.

Figure 9:
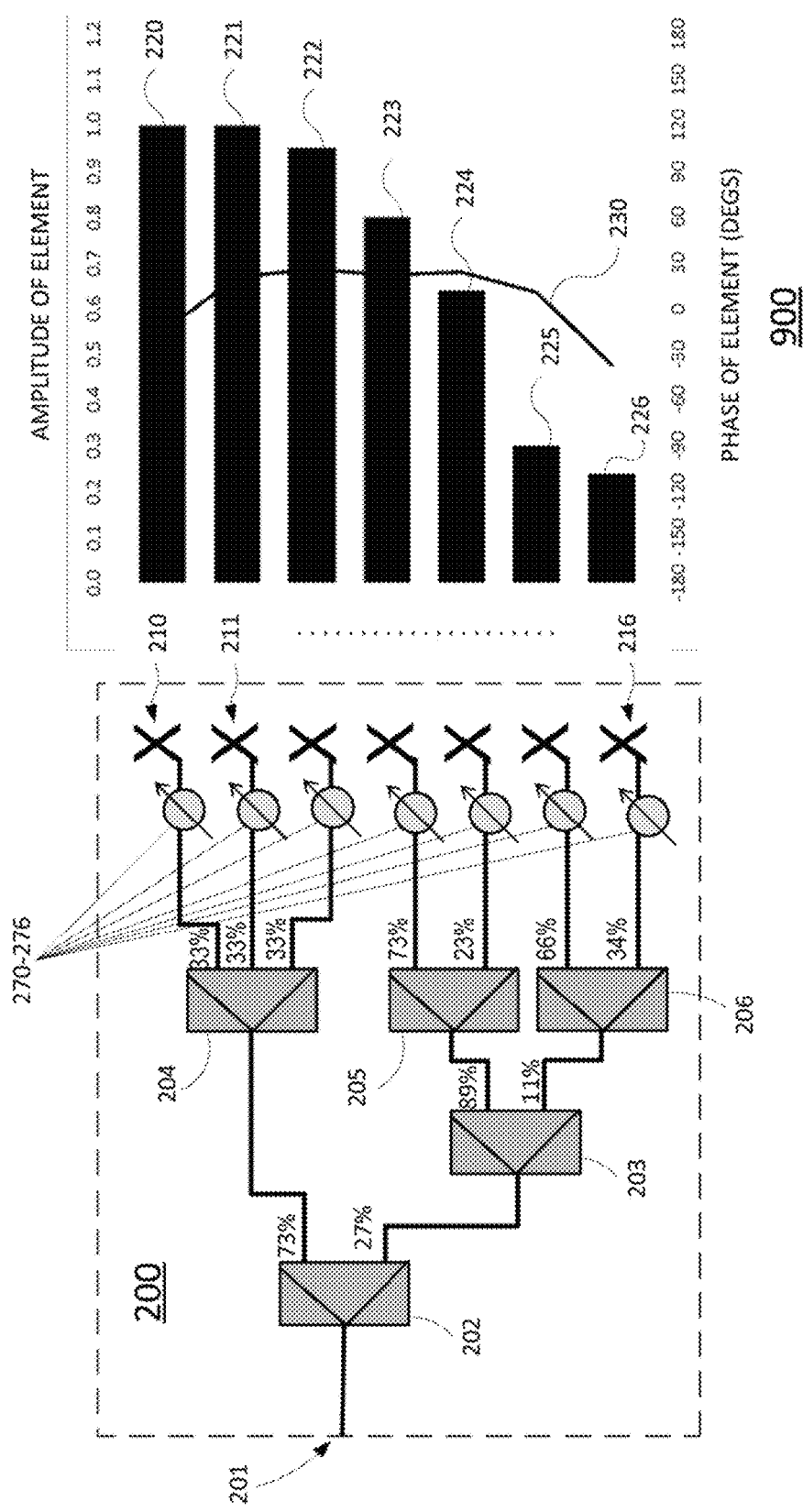
FIG. 9 depicts an example antenna system with a feed network, according to the present disclosure.

FIG. 9 depicts an example antenna system (200) implementing a passive beamforming feed network according to the present disclosure. An RF signal port (201) intended for connection from a base station radio for transmission and/or for reception by the antenna system (200) is connected to a feed network comprising of RF splitters (202, 203, 204, 205, 206). The feed network connects to 7 co-polarized antenna elements (210-216). Optional variable phase shifters (270-276) can be used between the feed network and the antenna elements (210-216) to vary the tilt of the radiated elevation pattern. The feed network thus splits the power of an RF signal intended for transmission at port (201) into a plurality of component signals to be used as drive signals for the array of antenna element (210-216). The arrangement of the RF splitters and the particular RF power splitting ratios are shown in FIG. 9. In this example, it can be seen that 73% of the total RF power of a signal applied at port (201) is allocated to the top three antenna elements. The resulting amplitude profile in voltage magnitude terms is illustrated in the graph 900 with amplitudes (220-226) corresponding to the antenna elements (210-216). The phase lengths from signal input port (201) to antenna elements (210-216) can be tuned using cable lengths or circuit board track lengths, depending on how the feed network is implemented physically. The intended phase weights for the antenna elements is depicted as phase profile (230). As such, amplitude weights and phase weights of the RF beamforming network are arranged to develop a directive beam and suppressed side-lobes over a range of angles in a far field of the antenna system (200) and to therefore provide a beam pattern of the directive beam that is suitable for cellular mobile communications networks.

Different arrangements of splitters, splitting ratios and splitters with different number of branches to that shown in FIG. 9 can achieve the same or similar amplitude profiles. Thus, the present disclosure may utilize other feed networks which have significant power allocated to the top most antenna elements but which can still create a far field radiation pattern, e.g., with USLS of 15 dB or better.

In addition, it should be noted that with respect to uplink communications, the distribution network is also configured to combine an RF signal intended for reception by the antenna array from a plurality of component signals. In one example, 73% of the total RF power of a signal applied at port (201) is allocated to 50% or fewer of the antenna elements towards one end (e.g., the top) of the array (e.g., antenna elements (210, 211). In another example, 80% of the total RF power of a signal applied at port (201) is allocated to 50% or fewer of the antenna elements towards one end (e.g., the top) of the array. In one example, the antenna system (200) is intended is for deployment on a building rooftop and for being deployed substantially away from edges of the building rooftop (e.g., set back 3 m or more (e.g., 6 m, 10 m, etc.), such that the appearance of the phased array antenna system is minimized when viewed from a ground level.

While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof.

What is claimed is:

1. A phased array antenna system, comprising:
   at least a first array of antenna elements; and
   at least a first radio frequency beamforming network configured to split the power of a radio frequency signal for transmission into a first plurality of component signals, the first plurality of component signals comprising drive signals for the at least the first array of antenna elements, the at least the first radio frequency beamforming network further configured to combine a radio frequency signal for reception by the phased array antenna system from a second plurality of component signals from the at least the first array of antenna elements, where a radio frequency power distribution of the at least the first radio frequency beamforming network is arranged to provide a weighting of the first plurality of component signals and the second plurality of component signals processed via antenna elements of the plurality of antenna elements towards one end of the at least the first array.

2. The phased array antenna system of claim 1, where amplitude weights and phase weights of the at least the first radio frequency beamforming network are arranged to develop a directive beam and suppressed side-lobes over a range of angles in a far field of the phased array antenna system, wherein a beam pattern of the directive beam is suitable for cellular mobile communications networks.

3. The phased array antenna system of claim 1, where amplitude weights of the at least the first radio frequency beamforming network are arranged to provide the radio frequency power distribution comprising an allocation of at least 73% of a total radio frequency power to 50% or fewer of the antenna elements towards the one end of the at least the first array.

4. The phased array antenna system of claim 1, where amplitude weights of the at least the first radio frequency beamforming network are arranged to provide the radio frequency power distribution comprising an allocation of at least 80% of a total radio frequency power to 50% or fewer of the antenna elements towards the one end of the at least the first array.

5. The phased array antenna system of claim 1, where the at least the first array is arranged in a vertical plane for beamforming in an elevation plane.

6. The phased array antenna system of claim 1, where the at least the first array is for deployment on a building rooftop.

7. The phased array antenna system of claim 6, where at least a first array is for deployment away from edges of the building rooftop such that the appearance of the at least the first array is minimized when viewed from a ground level.

8. The phased array antenna system of claim 1, where upper side-lobes of a far field radiation pattern of the at least the first array are suppressed by 15 dB or greater relative to a mainbeam of the far field radiation pattern over a range of up to 30 degrees above the mainbeam.

9. The phased array antenna system of claim 1, where the antenna system comprises a plurality of antenna arrays, the plurality of antenna arrays including the at least the first array, and a plurality of radio frequency beamforming networks, the plurality of radio frequency beamforming networks including the at least the first radio frequency beamforming network, the plurality of antenna arrays and the plurality of radio frequency beamforming networks designed to support at least one of:
   radio frequency diversity schemes;
   multiple spectrum bands; or
   multi-order multiple in-multiple out applications.

10. The phased array antenna system of claim 1, where the at least the first radio frequency beamforming network is a passive, reciprocal beamforming network.

11. The phased array antenna system of claim 1, where the at least the first array is an active antenna array, and where the at least the first radio frequency beamforming network is implemented at baseband using precoding vectors configured to be applied to user orientated data to develop user specific beamforming from the antenna system.

12. A method, comprising:
   deploying at least a first array of antenna elements of a radio frequency antenna system to a building rooftop, wherein the at least the first array of antenna elements is coupled to at least a first radio frequency beamforming network of the radio frequency antenna system, wherein the at least a first radio frequency beamforming network is configured to split the power of a radio frequency signal for transmission into a first plurality of component signals, the first plurality of component signals comprising drive signals for the at least the first array of antenna elements, the at least the first radio frequency beamforming network further configured to combine a radio frequency signal for reception by the phased array antenna system from a second plurality of component signals from the at least the first array of antenna elements, where a radio frequency power distribution of the at least the first radio frequency beamforming network is arranged to provide a weighting of the first plurality of component signals and the second plurality of component signals processed via antenna elements of the plurality of antenna elements towards one end of the at least the first array; and
   performing at least one of:
   transmitting the radio frequency signal for transmission via the at least the first radio frequency beamforming network and the at least the first array; or receiving the radio frequency signal for reception via the at least the first array and the at least the first radio frequency beamforming network.

13. The method of claim 12, wherein the deploying comprises deploying the at least the first array away from edges of the building rooftop such that the appearance of the at least the first array is minimized when viewed from a ground level.

14. The method of claim 12, where amplitude weights and phase weights of the at least the first radio frequency beamforming network are arranged to develop a directive beam and suppressed side-lobes over a range of angles in a far field of the phased array antenna system, wherein a beam pattern of the directive beam is suitable for cellular mobile communications networks.

15. The method of claim 12, where amplitude weights of the at least the first radio frequency beamforming network are arranged to provide the radio frequency power distribution comprising an allocation of at least 73% of a total radio frequency power to 50% or fewer of the antenna elements towards the one end of the at least the first array.

16. The method of claim 12, where amplitude weights of the at least the first radio frequency beamforming network are arranged to provide the radio frequency power distribution comprising an allocation of at least 80% of a total radio frequency power to 50% or fewer of the antenna elements towards the one end of the at least the first array.

17. The method of claim 12, where upper side-lobes of a far field radiation pattern of the at least the first array are suppressed by 15 dB or greater relative to a mainbeam of the far field radiation pattern over a range of up to 30 degrees above the mainbeam.

18. The method of claim 12, where the antenna system comprises a plurality of antenna arrays, the plurality of antenna arrays including the at least the first array, and a plurality of radio frequency beamforming networks, the plurality of radio frequency beamforming networks including the at least the first radio frequency beamforming network, the plurality of antenna arrays and the plurality of radio frequency beamforming networks designed to support at least one of:
radio frequency diversity schemes;
multiple spectrum bands; or
multi-order multiple in-multiple out applications.

19. The method of claim 12, where the at least the first radio frequency beamforming network is a passive, reciprocal beamforming network.

20. The method of claim 12, where the at least the first array is an active antenna array, and where the at least the first radio frequency beamforming network is implemented at baseband using precoding vectors configured to be applied to user orientated data to develop user specific beamforming from the antenna system.

* * * * *